(12) United States Patent
Iga et al.

(10) Patent No.: US 12,291,475 B2
(45) Date of Patent: May 6, 2025

(54) METHOD FOR FORMING MOLTEN GLASS, FORMING APPARATUS, AND METHOD FOR PRODUCING GLASS PRODUCT

(71) Applicant: AGC Inc., Chiyoda-ku (JP)

(72) Inventors: Motoichi Iga, Chiyoda-ku (JP); Toru Kamihori, Chiyoda-ku (JP); Masanori Nakano, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 305 days.

(21) Appl. No.: 16/529,306

(22) Filed: Aug. 1, 2019

(65) Prior Publication Data

US 2019/0352209 A1    Nov. 21, 2019

Related U.S. Application Data

(63) Continuation of application No. PCT/JP2018/005120, filed on Feb. 14, 2018.

(30) Foreign Application Priority Data

Feb. 15, 2017  (JP) .................................. 2017-026061

(51) Int. Cl.
  *C03B 17/06*  (2006.01)
  *C03B 18/12*  (2006.01)
  *C03B 18/18*  (2006.01)
  *C03B 25/093*  (2006.01)

(52) U.S. Cl.
  CPC .............. *C03B 17/06* (2013.01); *C03B 18/12* (2013.01); *C03B 18/18* (2013.01); *C03B 25/093* (2013.01)

(58) Field of Classification Search
  CPC ..................................................... C03B 18/18
  See application file for complete search history.

(56) References Cited

U.S. PATENT DOCUMENTS 3,206,292 A    9/1965  Pilkington et al.
3,218,141 A    11/1965  Lambert
(Continued)

FOREIGN PATENT DOCUMENTS

CN    103097309 A    5/2013
CN    105307989 A    2/2016
(Continued)

OTHER PUBLICATIONS

CN 103319074 machine translation, Oosuka et al., Glass Substrate for plasma display panel, Sep. 2013 (Year: 2013).*
(Continued)

*Primary Examiner* — Queenie S Dehghan
(74) *Attorney, Agent, or Firm* — Oblon, McClelland, Maier & Neustadt, L.L.P.

(57) ABSTRACT

To provide a method for forming molten glass, capable of easily improving the forming accuracy of molten glass. One embodiment of the method for forming molten glass of the present invention comprises a supplying in which molten glass having a temperature of at least the softening point is discharged in a strip shape and supplied on the surface of molten metal, and a transporting the glass ribbon supplied on the surface of the molten metal, wherein the transporting includes a cooling the glass ribbon being transported, in a region on the upstream side in the transport direction, so that the temperature of the glass ribbon becomes lower than the softening point in the entire width direction.

16 Claims, 8 Drawing Sheets

(56) References Cited

U.S. PATENT DOCUMENTS

| | | | | |
|---|---|---|---|---|
| 3,305,339 | A | * | 2/1967 | Plumat .................... C03B 18/04 |
| | | | | 65/92 |
| 3,318,671 | A | * | 5/1967 | Brichard ................. C03B 18/04 |
| | | | | 65/92 |
| 3,342,574 | A | | 9/1967 | Jewell |
| 3,652,250 | A | | 3/1972 | Brichard |
| 3,679,389 | A | | 7/1972 | Kanai |
| 4,203,750 | A | | 5/1980 | Shay |
| 2007/0130994 | A1 | * | 6/2007 | Boratav ................ C03B 17/064 |
| | | | | 65/29.21 |
| 2013/0047671 | A1 | | 2/2013 | Kohli |

FOREIGN PATENT DOCUMENTS

| | | |
|---|---|---|
| GB | 1 469 282 A | 4/1977 |
| JP | 41-15190 B1 | 8/1966 |
| JP | 48-21321 B1 | 6/1973 |
| JP | 55-136140 A | 10/1980 |
| JP | 2014-525391 A | 9/2014 |
| TW | 201619087 A | 6/2016 |
| WO | WO 2014/009766 A2 | 1/2014 |
| WO | WO 2016/158974 A1 | 10/2016 |

OTHER PUBLICATIONS

International Search Report issued Apr. 10, 2018 in PCT/JP2018/005120 filed Feb. 14, 2018.

* cited by examiner

METHOD FOR FORMING MOLTEN GLASS, FORMING APPARATUS, AND METHOD FOR PRODUCING GLASS PRODUCT

This application is a continuation of PCT Application No. PCT/JP2018/005120, filed on Feb. 14, 2018, which is based upon and claims the benefit of priority from Japanese Patent Application No. 2017-026061 filed on Feb. 15, 2017. The contents of those applications are incorporated herein by reference in their entireties.

TECHNICAL FIELD

The present invention relates to a method for forming molten glass, capable of easily improving forming accuracy of the molten glass, an apparatus for forming molten glass, and a method for producing a glass product.

BACKGROUND ART

A forming method for forming molten glass by supplying molten glass on the surface of molten metal, is known. For example, in Patent Document 1, a forming method for multilayered glass having three layers of strip-shaped molten glass laminated is described.

PRIOR ART DOCUMENTS

Patent Documents

Patent Document 1: WO2014/009766
Patent Document 2: JP-A-55-136140
Patent Document 3: U.S. Pat. No. 3,679,389

DISCLOSURE OF INVENTION

Technical Problems

In Patent Document 1, three layers of strip-shaped molten glass are laminated and supplied on the surface of molten metal, and the glass ribbon formed by the laminated molten glass is stretched by top rolls in the width direction, to mold the molten glass. However, in this case, in the width direction, the thickness of the glass ribbon tends to be uneven, whereby there was such a problem that the forming accuracy of the glass ribbon tends to be low. Further, also in Patent Document 2, a glass ribbon is stretched similarly by using top rolls, whereby the thickness of the glass ribbon tends to be uneven.

Further, for example, Patent Document 3 discloses a method for forming molten glass on the surface of molten metal, while suppressing the width of a glass ribbon from being shrinked, by cooling the edge portions in the width direction of the glass ribbon. In this case, although it is not necessary to stretch the glass ribbon by e.g. top rolls on the surface of molten metal, it is necessary to cool only the edge portions in the width direction of the glass ribbon, whereby there have been cases where the apparatus tends to be complicated, and it takes labor and time in the forming of molten glass.

In view of the above problems, it is an object of the present invention to provide a forming method for molten glass, whereby forming accuracy of molten glass can be easily improved, and a method for producing a glass product by using such a forming method. Further, it is another object to provide a forming apparatus for molten glass, whereby it is possible to improve the forming accuracy of molten glass by a simple structure, and a method for producing a glass product by using such a forming apparatus.

Solution to Problems

In order to solve the above problems, the present inventors have obtained such a new idea that instead of adjusting the thickness of a glass ribbon on the surface of molten metal, a glass ribbon having the thickness preliminarily adjusted is supplied on the surface of molten metal, and the thickness of the glass ribbon is maintained on the surface of the molten metal. According to this new idea, it is possible to mold molten glass without stretching the glass ribbon on the surface of the molten metal. Specifically, it is possible to solve the above problems by the following constructions based on this new idea.

One embodiment of the method for forming molten glass of the present invention comprises a supplying in which molten glass having a temperature of at least the softening point is discharged in a strip shape in the form of a glass ribbon, which is supplied on the surface of molten metal, and a transporting the glass ribbon supplied on the surface of the molten metal, wherein said transporting includes a cooling the glass ribbon being transported, in a region on the upstream side in the transport direction, so that the temperature of the glass ribbon becomes lower than the softening point in the entire width direction.

One embodiment of the forming apparatus for molten glass of the present invention comprises a bath to store molten metal, a supply device having a discharge section for discharging strip-shaped molten glass at a temperature of at least the softening point, to supply a glass ribbon on the surface of the molten metal by discharging the molten glass from the discharge section, a transport device for transporting the glass ribbon supplied on the surface of the molten metal, and a cooling device for cooling the glass ribbon being transported in a region on the upstream side in the transport direction, wherein the cooling device cools the glass ribbon so that the temperature of the glass ribbon becomes lower than the softening point in the entire width direction.

One embodiment of the method for producing a glass product of the present invention, comprises an annealing the glass ribbon which is molded by the above forming method.

Advantageous Effects of Invention

According to one embodiment of the present invention, it is possible to provide a forming method for molten glass, whereby the forming accuracy of molten glass can easily be improved, and a method for producing a glass product by using such a forming method. Further, according to another embodiment of the present invention, it is possible to provide a forming apparatus for molten glass, whereby the forming accuracy of molten glass can be improved by a simple structure, and a method for producing a glass product by using such a forming apparatus.

DESCRIPTION OF EMBODIMENTS

Hereinafter, with reference to the drawings, the forming method for molten glass, the forming apparatus for molten glass, and the method for producing a glass product according to embodiments of the present invention, will be described. Here, the present invention is not limited to the following embodiments and can be optionally changed within the scope of the technical idea of the present invention. Further, each of the following drawings is a schematic model diagram or illustration, in which, for clarity of each construction, there is a case where the scale, number, etc. in each structure, are made different from the scale, number, etc. in the real structure.

Figure 1:
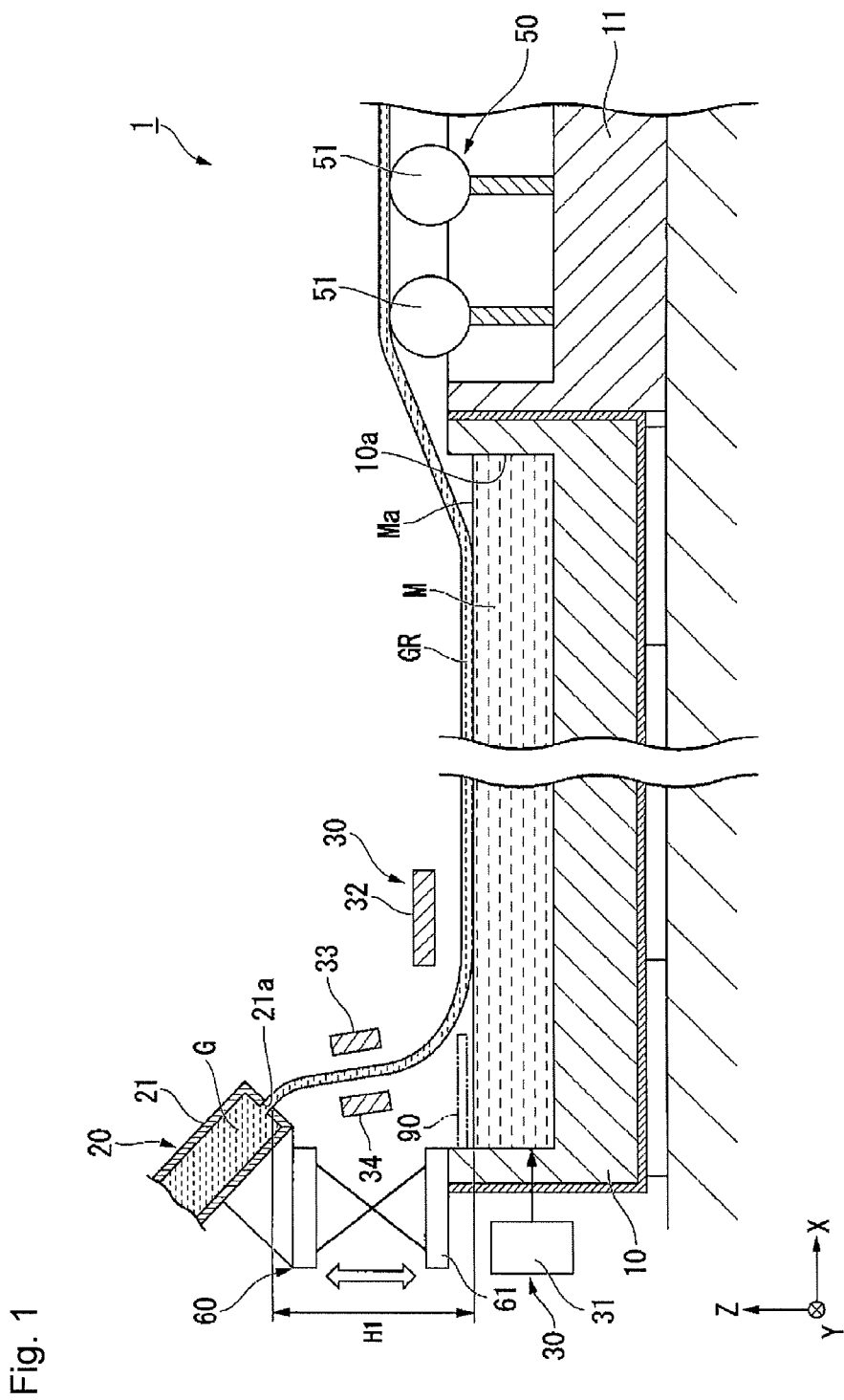
FIG. 1 is a cross-sectional view showing a portion of the forming apparatus for molten glass in the first embodiment.
Figure 2:
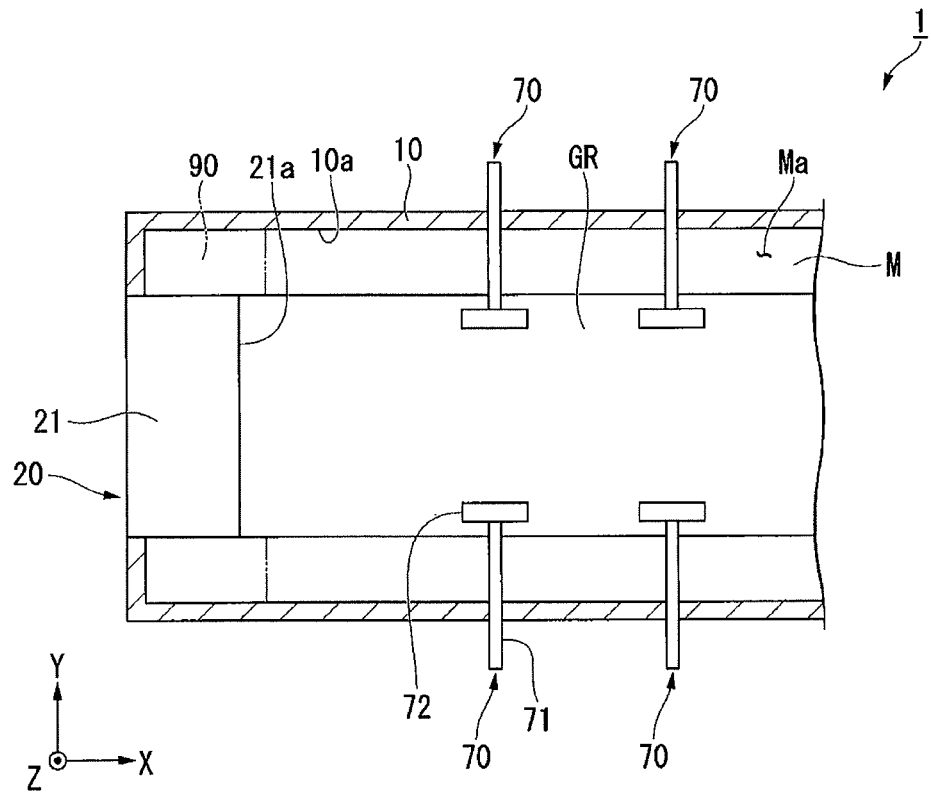
FIG. 2 is a plan view showing a portion of the forming apparatus for molten glass in the first embodiment.

In the drawings, the XYZ coordinate system is shown as an appropriate 3-dimensional orthogonal coordinate system, wherein the Z-axis direction is the vertical direction, the X-axis direction is the longitudinal direction of the forming apparatus 1 for molten glass G as shown in FIGS. 1 and 2, and the Y-axis direction is the width direction of the forming apparatus 1. In the Z-axis direction, the +Z side is the upper side in the vertical direction and the −Z side is the lower side in the vertical direction. The length direction of the forming apparatus 1 is a left-right direction in FIG. 1, and in this specification, is a transport direction of the glass ribbon GR. Further, the width direction of the forming apparatus 1 is an up-and-down direction in FIG. 2, and a direction perpendicular to both the transport direction of the glass ribbon GR and the vertical direction.

Here, in the present specification, the glass ribbon GR is a strip-shaped glass formed from the molten glass G. Further, the transport direction of the glass ribbon GR is a direction in which the glass ribbon GR is transported in a plan view of the forming apparatus 1. Further, the upstream side in the transport direction and the downstream side of the transport direction are ones to the transport direction of the glass ribbon GR in the forming apparatus 1. In each embodiment as described below, the +X side is the downstream side in the transport direction, the −X side is the upstream side in the transport direction.

In the following description, unless otherwise specified, the width direction shall mean the width direction of the forming apparatus 1 and the width direction of the glass ribbon GR, and the transport direction shall mean the transport direction of the glass ribbon GR.

First Embodiment

The forming apparatus 1 in the first embodiment shown in FIG. 1, is an apparatus for forming molten glass G. The forming apparatus 1 comprises a bath device 10, a roof (not shown), a supply device 20, a dross box 11 and a cooling device 30.

The bath device 10 has a bath 10a which opens on the upper side in the vertical direction. In the bath 10a, molten metal M is stored. Molten metal M is preferably e.g. molten tin, a molten tin alloy, etc. The temperature of the molten metal M is preferably lowered toward the downstream side in the transport direction. The roof (not shown) covers the upper side of the bath device 10. On the upper side in the vertical direction of the bath device 10, a space surrounded by the roof is provided. The space is preferably filled with a reducing (non-oxidizing) gas or an inert gas, in order to prevent the molten metal M in the bath 10a from being oxidized. The reducing gas may, for example, be a mixed gas of nitrogen and hydrogen.

The supply device 20 is provided on the upstream side in the transport direction of the bath device 10. The supply device 20 has a glass melting furnace (not shown), and a discharge section 21. The glass melting furnace will melt glass raw material to produce molten glass G. The discharge section 21 discharges the molten glass G. The discharge section 21 is, for example, a cylindrical shape extending in a direction inclined to the lower side in the vertical direction from the upstream side in the transport direction toward the downstream side in the transport direction. At the forward end of the discharge section 21, a slit 21a that connects the inside and the outside of the discharge section 21 is formed.

The slit 21a extends in the width direction. As the molten glass G in the discharge section 21 is discharged through the slit 21a, the molten glass G is made to be a glass ribbon GR being strip-shaped molten glass. The width dimension of the glass ribbon GR discharged from the slit 21a will be, as shown in FIG. 2, approximately the same as the width dimension of the slit 21a. The glass ribbon GR discharged from the slit 21a will be, as shown in FIG. 1, supplied on the surface Ma of molten metal M. In the following description, molten glass G which is made to be in a strip-shape, will be called a glass ribbon GR.

In the first embodiment, the discharge section 21 is disposed on the upper side in the vertical direction of the surface Ma of the molten metal M. Therefore, the glass ribbon GR discharged from the slit 21a of the discharge section 21, falls downward in the vertical direction, and will be supplied on the surface Ma of the molten metal M. Thus, the supply device 20 discharges the glass ribbon GR from the discharge section 21 and supplies it on the surface Ma of the molten metal M.

The temperature of the glass ribbon GR discharged from the discharge section 21 is at least the softening point. The softening point of the molten glass G is, for example, about 750° C. when the molten glass G is soda lime glass. With respect to the temperature of the glass ribbon GR discharged from the discharge section 21, the upper limit is not particularly limited, but is preferably at most the softening point +500° C. of the molten glass G. The temperature of the glass ribbon GR discharged from the discharge section 21 in the first embodiment, is preferably a temperature at which the viscosity η [dPa·s] of the molten glass G becomes within a range of 1.5≤log η≤5. Specifically, for example, in a case where the molten glass G is soda lime glass, the temperature of the glass ribbon GR discharged from the discharge section 21 is preferably at a level of at least 940° C. and at most 1,600° C.

In this specification, the viscosity η [dPa·s] of the molten glass G is a value measured in accordance with JIS Z8803 (2011, Viscometry of liquids). In the measurement, a single cylindrical rotational viscometer was used. As the single cylindrical rotational viscometer, for example, an inner cylinder rotational viscometer of GM Series, as a product of Motoyama Co. Ltd. (Osaka-city, Japan) may be used.

The dross box 11 is provided on the downstream side in the transport direction, of the bath device 10. The dross box 11 has a transport device 50 for transporting the glass ribbon GR supplied onto the surface Ma of the molten metal M. The transport device 50 has a plurality of glass transport rolls 51. The glass transport rolls 51 transport the glass ribbon GR supplied on the surface Ma of the molten metal M, from the upstream side in the transport direction toward the downstream side in the transport direction. The glass transport rolls 51 pull up the glass ribbon GR from the surface Ma of the molten metal M and transport it to an annealing furnace (not shown).

Although not shown, an annealing furnace is provided on the downstream side in the transport direction of the dross box 11. The annealing furnace preferably anneals the temperature of the glass ribbon GR to at most the strain point, while transporting the glass ribbon GR molded by the forming apparatus 1 in the transport direction. In a case where the molten glass G is soda lime glass, the temperature of the annealing furnace, is, for example, about 700° C. on the upstream side in the transport direction and, for example, about 300° C. on the downstream side in the transport direction.

The cooling device 30 cools the glass ribbon GR being transported, in the region on the upstream side in the transport direction. The cooling device 30 cools the glass ribbon GR so that the temperature of the glass ribbon GR becomes lower than the softening point in the entire width direction. More particularly, it is preferred that the cooling device 30 cools the glass ribbon GR so that the temperature of the glass ribbon GR becomes lower than the softening point and higher than the annealing point in the entire width direction.

The annealing point of the molten glass G is, for example, about 560° C. in a case where the molten glass G is soda lime glass. That is, for example, in a case where the molten glass G is soda lime glass, the cooling device 30 cools the glass ribbon GR so that in the region on the upstream side in the transport direction, the temperature of the glass ribbon GR being transported becomes at a level of at least 560° C. and at most 750° C. in the entire width direction. In the case where the temperature of the glass ribbon GR is lower than the softening point and higher than the annealing point in the entire width direction, the viscosity η [dPa·s] of the glass ribbon GR (the molten glass G) is preferably in the range of $7<\log \eta<13$.

The region on the upstream side in the transport direction includes, for example, a region located on the upstream side in the transport direction than the center in the transport direction of the bath 10a. Further, the region on the upstream side in the transport direction includes, for example, a range of preferably within about 500 mm on the downstream side in the transport direction from the portion of the molten metal M where the glass ribbon GR discharged from the discharge section 21 will first contact.

In the first embodiment, the cooling device 30 has a temperature adjusting section 31 and a first cooling section 32. The temperature adjusting section 31 preferably adjusts so that the temperature of the molten metal M at the portion where the glass ribbon GR is supplied, becomes lower than the softening point of the molten glass G and higher than the annealing point of the molten glass G. That is, for example, in a case where the molten glass G is soda lime glass, the temperature adjusting section 31 adjusts so that the temperature of the molten metal M at the portion where the glass ribbon GR is supplied, becomes at a level of at least 560° C. and at most 750° C. The temperature of the molten metal M adjusted by the temperature adjustment section 31 is lower than the temperature of a conventional molten metal M.

In the molten metal M, the portion where the glass ribbon GR is supplied, includes the portion of the molten metal M where the glass ribbon GR discharged from the discharge section 21 will first contact, and the portion in the vicinity thereof. As the glass ribbon GR discharged from the discharge section 21 is in contact with the molten metal M having the temperature adjusted by the temperature adjusting section 31, the glass ribbon GR can be cooled.

For example, the metal constituting the molten metal M is melted as the temperature inside surrounded by the bath device 10 and the roof becomes high. If the temperature adjustment section 31 is not provided, the temperature of the molten metal M becomes, for example, about 1,050° C. on the upstream side in the transport direction. The temperature of the molten metal M thus melted, is adjusted to a temperature as described above by the temperature adjusting section 31. The method of cooling the molten metal M is not particularly limited, and it may be air-cooling or liquid cooling, or one that dissipates heat on the downstream side in the transport direction by heat conduction. Here, in a case where the temperature of the molten metal M melted by the temperature of the inside surrounded by the bath device 10 and the roof, is lower than the desired temperature, the temperature adjusting unit 31 may heat the molten metal M to bring the temperature of the molten metal M to be the desired temperature.

The first cooling section 32 is disposed on the upper side in the vertical direction of the bath 10a. The first cooling section 32 cools the glass ribbon GR from the opposite side to the molten metal M side, i.e. from the upper side in the vertical direction. The construction of the first cooling section 32 is not particularly limited so long as it is possible to cool the glass ribbon GR. The first cooling section 32 may be a blower for blowing air to the glass ribbon GR, or it may be a cooling tube having a flow passage through which a refrigerant flows inside. Further, fins for heat dissipation may be provided in the cooling tube.

The forming apparatus 1 may further be provided with an adjusting device 60. The adjusting device 60 is capable of adjusting the distance between the discharge section 21 and the surface Ma of the molten metal M. In the first embodiment, the distance between the discharge section 21 and the surface Ma of the molten metal Ma, is the distance H1 in the vertical direction between the slit 21a of the discharge section 21 and the surface Ma of the molten metal M. The distance H1 is, for example, preferably at least 1 mm and at most 100 mm, more preferably at least 5 mm and at most 50 mm. The adjusting device 60 in the first embodiment has a lifting device 61.

The lifting device 61 is provided at an end on the upper side in the vertical direction at the end on the upstream side in the transport direction of the bath device 10 and supports the supply device 20 from the lower side in the vertical direction. The lifting device 61 raises and lowers the supply device 20. By raising and lowering the supply device 20 by the lifting device 61, the adjusting device 60 raises and lowers the discharge section 21, whereby it is possible to adjust the distance H1 in the vertical direction between the slit 21a of the discharge section 21 and the surface Ma of the molten metal M.

The forming apparatus 1 is further provided with second cooling sections 33, 34. The second cooling sections 33, 34 are disposed between the bath 10a and the discharge section 21. The second cooling section 34 is disposed with a space on the upstream side in the transport direction of the second cooling section 33. The glass ribbon GR discharged from the discharge section 21 is supplied to the surface Ma of the molten metal M, through the space in the transport direction between the second cooling section 33 and the second cooling section 34.

The second cooling sections 33, 34 will cool the glass ribbon GR for a period of time from being discharged from the discharge section 21 until the glass ribbon GR is supplied on the surface Ma of the molten metal M. The second cooling sections 33, 34 may be blowers for blowing air to the glass ribbon GR, or may be cooling tubes having a flow passage through which a refrigerant flows inside.

As shown in FIG. 2, the forming apparatus 1 is further provided with a plurality of guide rolls 70. The guide rolls 70 are disposed to face each other at the wall portions on both sides in the width direction of the bath 10a. A guide roll 70 is constituted by a guide roll body 72 for supporting the end portion in the width direction of the glass ribbon GR, and a rotary shaft 71 connected to the guide roll body 72. The rotary shaft 71 extends in the width direction. When the rotary shaft 71 is rotated by a driving device such as an electric motor, the guide roll body 72 will rotate to send out an edge in the width direction of the glass ribbon GR to the downstream side in the transport direction. The rotational speed of the guide rolls 70 is the same as the rotational speed of the glass-transporting rolls 51 in the transport device 50. As will be described later, the guide rolls 70 are different in function from the top rolls as described in the background art, or from the top rolls for stretching the glass ribbon in the width direction and the transport direction, to be used in a float process as the prior art.

Figure 3:
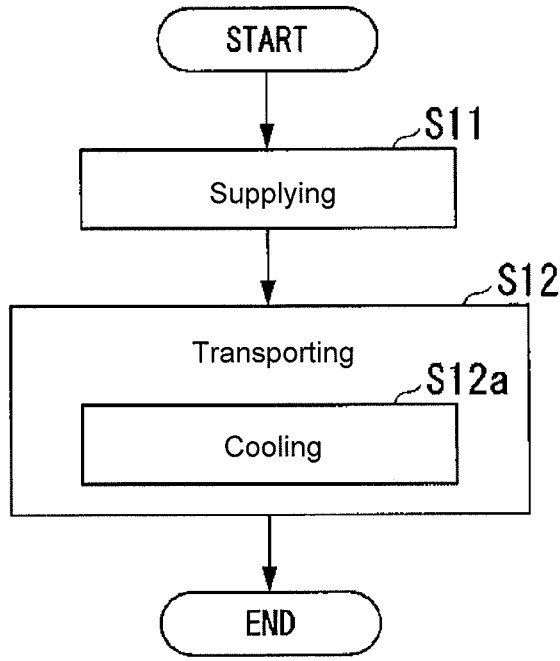
FIG. 3 is a flowchart showing the procedure of the forming method for molten glass in the first embodiment.

Next, the forming method for molten glass G using the above-described forming apparatus 1 will be described. As shown in FIG. 3, the forming method in the first embodiment comprises a supplying S11 and a transporting S12.

The supplying S11 is a step in which molten glass G having a temperature of at least the softening point is discharged in a strip shape to form the glass ribbon GR, which is supplied on the surface Ma of the molten metal M. First, the molten glass G having a temperature of at least the softening point is produced in a glass melting furnace (not shown) in the supply device 20. In the first embodiment, the temperature of the molten glass G in the supplying S11 is preferably set to be a temperature at which the viscosity η [dPa·s] of the molten glass G becomes within a range of 1.5≤log η≤5. Then, the molten glass G produced in the glass melting furnace is discharged from the slit 21a of the discharge section 21 to let the molten glass G be formed into a glass ribbon GR.

The glass ribbon GR discharged from the slit 21a is dropped downward in the vertical direction so that it can be supplied on the surface Ma of the molten metal M. In the supplying S11 in the first embodiment, by using the second cooling sections 33, 34, the glass ribbon GR can be cooled during a period in which the glass ribbon GR is dropped. At that time, the temperature of the glass ribbon GR is adjusted so as not to be lower than the softening point. In the first embodiment, the viscosity η [dPa·s] of the glass ribbon GR is preferably adjusted so that it will not become 1.5>log η. By letting the glass ribbon GR having a temperature of at least the softening point be dropped downward in the vertical direction, the glass ribbon GR is stretched by the own weight of the glass ribbon GR, whereby it is possible to reduce the thickness of the glass ribbon GR. Thus, the thickness of the glass ribbon GR can be made to be a desired thickness.

The transporting S12 is a step of transporting the glass ribbon GR supplied on the surface Ma of the molten metal M. While supporting both edge portions in the width direction of the glass ribbon GR by a plurality of guide rolls 70, the glass ribbon GR can be transported by the glass-transporting rolls 51 of the transport device 50. In the transporting S12, it is preferred not to pull the glass ribbon GR.

In this specification, not to pull the glass ribbon GR includes that a force to deform the glass ribbon GR by stretching it to at least one of the width direction and the transport direction, is not exerted to the glass ribbon GR. For example, in the first embodiment, to the glass ribbon GR, a force for transporting the glass ribbon GR is exerted, but a force for deforming the glass ribbon GR in at least one of the width direction and the transport direction is not exerted. That is, not to pull the glass ribbon GR in the transporting S12, includes that at the time of transporting the glass ribbon GR, a force to deform by stretching the glass ribbon GR in the width direction, or a force to deform by stretching the glass ribbon GR in the transport direction, is not exerted to the glass ribbon GR.

The transporting S12 includes a cooling S12a of cooling the glass ribbon GR being transported, in the region on the upstream side in the transport direction, so that the temperature of the glass ribbon GR becomes lower than the softening point in the entire width direction. In the cooling S12a in the first embodiment, by using a cooling device 30, the glass ribbon GR can be cooled so that the temperature of the glass ribbon GR becomes lower than the softening point and higher than the annealing point in the entire width direction.

In the first embodiment, in the cooling S12a, the glass ribbon GR is cooled by the molten metal M. In advance, by using the temperature adjusting section 31 of the cooling device 30, the temperature of the molten metal M at the portion where the glass ribbon GR is supplied, is made to be lower than the softening point of the molten glass G and higher than the annealing point of the molten glass G. As described above, since the temperature of the molten glass G in the supplying S11 is higher than the softening point, the glass ribbon GR is cooled by contact with the molten metal M when supplied on the surface Ma of the molten metal M.

Further, in the first embodiment, in the cooling S12a, by using the first cooling section 32 of the cooling device 30, the glass ribbon GR can be cooled from the opposite side to the molten metal M, i.e. from the upper side in the vertical direction in the first embodiment. Thus, in the first embodiment, in the cooling S12a, the glass ribbon GR can be cooled by using the molten metal M and the first cooling section 32.

In this specification, "the glass ribbon GR being transported is cooled in the region on the upstream side in the transport direction, so that the temperature of the glass ribbon GR becomes lower than the softening point", means that so long as the temperature of the glass ribbon GR becomes lower than the softening point in the region on the upstream side in the transport direction, the temperature of the glass ribbon GR may be changed in any way. For example, the temperature of the glass ribbon GR may become lower than the softening point at the time of the contact with the molten metal M, or may gradually be lowered and becomes lower than the softening point after contact with the molten metal M.

By the supplying S11 and the transporting S12 as described above, it is possible to mold the molten glass G to obtain a glass ribbon GR having a desired thickness.

Figure 11:
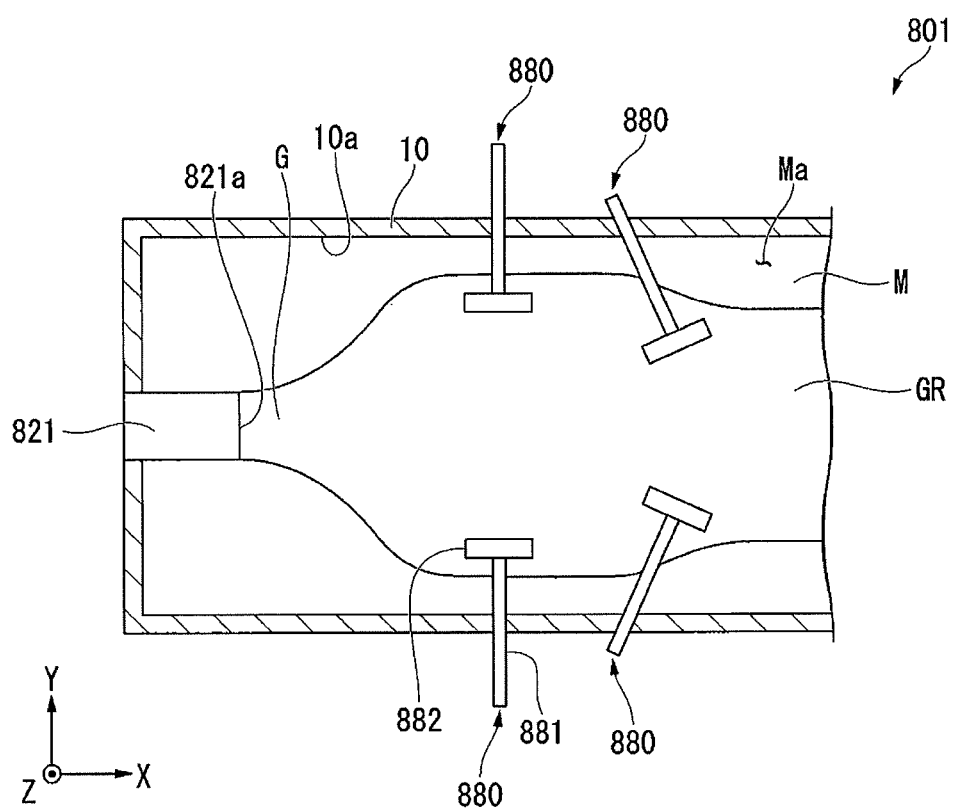
FIG. 11 is a plan view showing a portion of the forming apparatus for molten glass in a Comparative Example.

According to the first embodiment, it is possible to easily improve the forming accuracy of the molten glass G, as compared with the forming device 801 for molten glass G in the Comparative Example shown in FIG. 11. This will be described in detail below.

As shown in FIG. 11, the forming apparatus 801 for molten glass G in the Comparative Example is provided with a plurality of top rolls 880 which are used in a conventional float process. The top rolls 880 are disposed to face each other at the wall portions on both sides in the width direction of the bath 10a. A top roll 880 is constituted by a top roll body 882 to support an edge in the width direction of the glass ribbon GR, and a rotary shaft 881 which is connected to the top roll body 882. A plurality of top rolls 880 include a top roll 880 of which the rotary shaft 881 extends in the width direction, and a top roll 880 of which the rotary shaft 881 extends as inclined to the downstream side in the transport direction relative to the width direction.

The width dimension of the slit 821a in the discharge section 821 is smaller than the width dimension of the glass ribbon GR to be molded. The glass ribbon GR discharged from the slit 821a and supplied on the surface Ma of the molten metal M, is pulled and stretched in the width direction by the top rolls 880. The rotational speed of the top rolls 880 is slower than the rotational speed of the glass transport rolls 51 of the transport device 50. Therefore, by the difference between the rotational speed of the top rolls 880 and the rotational speed of the glass transport rolls 51, the glass ribbon GR is pulled and stretched in the transport direction. Thus, in the forming device 801 in the Comparative Example, the glass ribbon GR supplied on the surface Ma of the molten metal M is pulled and stretched in the width direction and in the transport direction for forming.

Here, in the forming device 801 in the Comparative Example, it is necessary to stretch the glass ribbon GR on the surface Ma of the molten metal M, and therefore, the temperature of the molten glass G supplied on the surface Ma of the molten metal M is at least the softening point. Further, in the Comparative Example, the temperature of the molten metal M at the portion where the glass ribbon GR is supplied, is, for example, about 1,050° C.

As in the Comparative Example, in a case where the glass ribbon GR supplied on the surface Ma of the molten metal M is pulled and stretched for forming, it is difficult to make the force exerted to the glass ribbon GR to be uniform in the width direction. Therefore, there has been such a problem that the thickness of the glass ribbon GR tends to become uneven in the width direction.

The present inventors have obtained such a new idea that in order to solve the above problems, instead of adjusting the thickness of the glass ribbon GR on the surface Ma of the molten metal M, the glass ribbon GR having the thickness preliminarily adjusted, is supplied on the surface Ma of the molten metal M, and the thickness of the glass ribbon GR is maintained on the surface Ma of the molten metal M.

According to this new idea, molten glass G can be molded without stretching the glass ribbon GR on the surface Ma of the molten metal M. Specifically, as in the above-described first embodiment, by using the cooling apparatus 30, the glass ribbon GR being a strip-shaped molten glass G is cooled, in the region on the upstream side in the transport direction, so that the temperature of the glass ribbon GR becomes lower than the softening point in the entire width direction.

For example, in a case where the temperature of the glass ribbon GR is at least the softening point, the glass ribbon GR supplied onto the surface Ma of the molten metal M is deformed to become a predetermined equilibrium thickness due to the surface tension. Therefore, in the Comparative Example, by pulling and stretching the glass ribbon GR, the glass ribbon GR was molded to be thinner than the equilibrium thickness. For example, in a case where the molten glass G is soda lime glass, and the molten metal M is molten tin, the equilibrium thickness of the glass ribbon GR deformed by surface tension, is about 6 mm.

Whereas according to the first embodiment, the glass ribbon GR transported on the surface Ma of the molten metal M is cooled to become lower than the softening point in the region on the upstream side in the transport direction. Therefore, it is possible to suppress the glass ribbon GR supplied on the surface Ma of the molten metal M from being deformed to a predetermined thickness by the surface tension. Thus, it becomes possible to transport the glass ribbon GR without pulling it, while maintaining the thickness of the glass ribbon GR at the time of being supplied on the surface Ma of the molten metal M. Accordingly, in the supplying S11, by supplying the molten glass G to the surface Ma of the molten metal M in the form of a glass ribbon GR having the desired thickness, the glass ribbon GR can be transported while maintaining the desired thickness. Thus, it is possible to mold the glass ribbon GR without pulling it, whereby it is easy to make the thickness of the glass ribbon GR uniform in the width direction, and it is possible to improve the forming accuracy of the molten glass G.

Here, in this specification, "it is possible to maintain the thickness of the glass ribbon GR on the surface Ma of the molten metal M" includes, not only a case where it is possible to strictly maintain the thickness of the glass ribbon GR, but also a case where it is possible to substantially maintain the thickness of the glass ribbon GR. The case where it is possible to substantially maintain the thickness of the glass ribbon GR includes a case where the ratio of the thickness of the glass ribbon GR to be finally formed, to the thickness of the glass ribbon GR at the time of being supplied on the surface Ma of the molten metal M, is, for example, larger than 1.0 and at most 1.3.

For example, in a case where the temperature of the glass ribbon GR at the time of being supplied to the molten metal M is at least the softening point, the glass ribbon GR shrinks in the width direction and, the thickness of the glass ribbon GR increases during the period until the temperature of the glass ribbon GR becomes lower than the softening point. The time until the temperature of the glass ribbon GR becomes lower than the softening point on the surface Ma of the molten metal M, can be estimated from the physical properties of the glass ribbon GR, the cooling degree by the cooling device 30, etc. The change in the width dimension of the glass ribbon GR and the change in thickness of the glass ribbon GR, will change by the viscosity η of the glass ribbon GR, i.e. by the temperature of the glass ribbon GR. From these conditions, the change in thickness of the glass ribbon GR on the surface Ma of the molten metal M may be estimated, and the thickness of the glass ribbon GR to be supplied in the supplying S11 may be made to be a value reduced by the amount corresponding to the change on the surface Ma of the molten metal M. It is thereby possible to mold the molten glass G accurately to the desired thickness.

Further, according to the first embodiment, the temperature of the glass ribbon GR is made lower than the softening point in the entire width direction, whereby cooling of the glass ribbon GR is easy, as compared with the case where only the edge portions in the width direction of the glass ribbon GR are cooled. Moreover, it is possible to simplify the construction of the cooling device 30. Accordingly, it is possible to facilitate the forming of the molten glass G, and it is possible to make the structure of the forming apparatus 1 to be simple.

As described above, according to the first embodiment, it is possible to make the structure of the forming apparatus 1 to be simple, and it is possible to easily improve the forming accuracy of the molten glass G.

Further, according to the first embodiment, since there is no need to pull the glass ribbon GR on the surface Ma of the molten metal M for forming, there is no need to provide a space for pulling the glass ribbon GR in the bath device 10. Therefore, according to the first embodiment, it is possible to reduce the size in the transport direction of the bath device 10, and it is possible to have the entire forming apparatus 1 small-sized in the transport direction.

Further, for example, if the temperature of the glass ribbon GR is made to be at most the annealing point in the region on the upstream side in the transport direction, there is a case where the glass ribbon GR is broken by an excessive temperature change. In contrast, according to the first embodiment, by using the cooling device 30, it is possible to cool the glass ribbon GR so that in the region on the upstream side in the transport direction, the temperature of the glass ribbon GR becomes lower than the softening point and higher than the annealing point in the entire width direction. Therefore, it is possible to suppress the temperature of the glass ribbon GR from changing excessively, and it is possible to prevent the glass ribbon GR from being broken.

Further, according to the first embodiment, it is possible to cool the glass ribbon GR by the molten metal M, by supplying the glass ribbon GR on the surface Ma of the molten metal M, which is adjusted to a temperature lower than the softening point of the molten glass G and higher than the annealing point of the molten glass G. Therefore, the glass ribbon GR is in contact with the surface Ma of the molten metal M, whereby it is possible to start the cooling S12a immediately after initiation of the transporting S12. It is thereby possible to shorten the time until the temperature of the glass ribbon GR becomes lower than the softening point, and it is possible to prevent the glass ribbon GR from shrinkage and to prevent a change in the thickness of the glass ribbon GR in the transporting S12. Therefore, it is easy to make the thickness of the glass ribbon GR to be molded, to be the desired thickness.

Further, according to the first embodiment, in the cooling S12a, it is possible to cool the glass ribbon GR from the opposite side to the molten metal M side by using the first cooling section 32. Therefore, by combining the cooling by the molten metal M, it is possible to cool the glass ribbon GR from both sides in the vertical direction. It is thereby possible to further shorten the time until the temperature of the glass ribbon GR becomes lower the softening point, and it is possible to further suppress the glass ribbon GR from shrinkage and suppress a change in the thickness of the glass ribbon GR in the transporting S12. Further, as compared with the case of changing the temperature of the molten metal M, the output of the first cooling section 32 can easily be changed, whereby it is easy to adjust the temperature of the glass ribbon GR.

Further, according to the first embodiment, in the supplying S11, it is possible to supply the glass ribbon GR on the surface Ma of the molten metal M by letting the glass ribbon GR be dropped downward in the vertical direction from the discharge section 21 disposed on the upper side in the vertical direction of the surface Ma of the molten metal M. Therefore, it is possible to adjust the thickness of the glass ribbon GR by stretching the glass ribbon GR by its own weight. In such a case, the own weight of the glass ribbon GR is exerted uniformly at any position in the width direction, whereby the glass ribbon GR is stretched uniformly in the entire width direction. Therefore, unlike the case of stretching by using top rolls 880 like the forming apparatus 801 in the Comparative Example, it is possible to prevent the thickness of the glass ribbon GR from becoming uneven.

Further, according to the first embodiment, the viscosity η [dPa·s] of the glass ribbon GR in the supplying S11 is preferably in a range of $1.5 \leq \log \eta \leq 5$. Therefore, the viscosity of the glass ribbon GR to be dropped can be made to be relatively small, and the glass ribbon GR can be made to be easily stretched by its own weight. Thus, it is easy to adjust the thickness of the glass ribbon GR in the supplying S11.

Further, according to the first embodiment, in the supplying S11, while dropping the glass ribbon GR, it is possible to cool the glass ribbon GR by using the second cooling sections 33, 34. Therefore, for example, in a case where the viscosity of the glass ribbon GR is too small at the time of being discharged from the discharging section 21, so that when dropped, the thickness of the glass ribbon GR tends to be too thin, it is possible to cool the glass ribbon GR to increase the viscosity of the glass ribbon GR. Thus, it is thereby possible to suitably change the thickness of the glass ribbon GR at the time when the glass ribbon GR is dropped.

Further, according to the first embodiment, it is preferred not to pull the glass ribbon GR in the transporting S12. Thus, as described above, it is possible to prevent the thickness of the glass ribbon GR from becoming uneven in the width direction.

Further, according to the first embodiment, in the supplying S11, it is possible to form the molten glass G in a strip-shape by discharging the molten glass G from the slit 21a of the discharge section 21. Therefore, it is easy to form the molten glass G into the glass ribbon GR.

Further, according to the first embodiment, an adjusting device 60 may be provided which is capable of adjusting the distance in the vertical direction between the discharge section 21 and the surface Ma of the molten metal M. The change in thickness of the glass ribbon GR by dropping the glass ribbon GR downward in the vertical direction, becomes larger as the time of being dropped downward in the vertical direction is longer. That is, as the time for the glass ribbon GR to be dropped, is prolonged by increasing the distance in the vertical direction between the discharge section 21 and the surface Ma of the molten metal M, the glass ribbon GR is stretched by its own weight, and the thickness of the glass ribbon GR becomes small. On the other hand, as the time for the glass ribbon GR to be dropped, is made shorter by reducing the distance in the vertical direction between the discharge portion 21 and the surface Ma of the molten metal M, the amount of the glass ribbon GR to be stretched by its own weight becomes small, and the thickness of the glass ribbon GR becomes large. Thus, it is possible to adjust the thickness of the glass ribbon GR to be supplied on the surface Ma of the molten metal M by adjusting the distance in the vertical direction between the discharge section 21 and the surface Ma of the molten metal M by the adjusting device 60.

Further, according to the first embodiment, the adjusting device 60 may have a lifting device 61 for raising and lowering the supply device 20. Therefore, it is possible to easily adjust the distance in the vertical direction between the discharge section 21 and the surface Ma of the molten metal M by raising and lowering the supply device 20.

Further, for example, if the temperature of the molten glass G in contact with the inner wall of the discharge section 21 is maintained at a specific temperature, there may be a case where a part of the molten glass G is crystallized to undergo devitrification. Once the devitrification takes place, the crystallized molten glass G tends to be adhered to the inner wall of the discharge section 21, whereby there may be a case where the flatness of the shape of the glass ribbon GR discharged from the discharge section 21 is deteriorated.

For example, in a down-draw method or the like, if the viscosity of the molten glass G is made small by increasing the temperature of the molten glass G discharged from the discharge section, there was a case where the dropping speed of the molten glass G tends to be too large, whereby the molded glass ribbon may not be suitably received. Therefore, it was necessary to make the temperature of the molten glass G to be low to some extent, to increase the viscosity of the molten glass G. Accordingly, there was a case where the temperature of the molten glass G is maintained at a temperature at which the devitrification occurs, and due to the devitrification, the flatness of the shape of the glass ribbon GR is deteriorated.

Whereas, according to the first embodiment, it is possible to receive the dropped glass ribbon GR by the molten metal M, whereby even if the viscosity of the molten glass G is made small by increasing the temperature of the molten glass G, it is possible to suitably mold the molten glass G. Thus, it is possible to suitably mold the molten glass G, even if the temperature of the molten glass G is made higher than the temperature at which devitrification occurs. Here, for example, in a case where the molten glass G is soda lime glass, the specific temperature at which the molten glass G undergoes devitrification, is about 1,000° C.

Further, according to the first embodiment, it is possible to provide guide rolls 70 as shown in FIG. 2. When the guide rolls 70 are provided, it is possible to suppress displacement of the position in the width direction of the glass ribbon GR. Thus, it is possible to transport the glass ribbon GR more smoothly on the surface Ma of the molten metal M. Further, the guide rolls 70 are rotated at the same rotational speed as the glass-transporting rolls 51 of the transport device 50, whereby they do not pull the glass ribbon GR.

Further, the temperature of the molten metal M at the portion where the glass ribbon GR is supplied, may be higher than the softening point of the molten glass G. Even in such a case, it is possible to cool the glass ribbon GR, so long as the temperature of the molten metal M at the portion where the glass ribbon GR is supplied, is lower than the case in the Comparative Example. The temperature of the molten metal M at the portion where the glass ribbon GR is supplied, can be made to be, for example, at most 900° C. by using the temperature adjusting section 31. In such a case, for example, when the molten glass G is soda lime glass, it is possible to make the temperature of the molten metal M at the portion where the glass ribbon GR is supplied, to be sufficiently low as compared with the Comparative Example, and it is possible to suitably cool the glass ribbon GR.

Further, the cooling device 30 may cool the glass ribbon GR so that in the region on the upstream side in the transport direction, the temperature of the glass ribbon GR becomes at most the annealing point in the entire width direction. The cooling device 30 may be constructed to have either one of the temperature adjusting section 31 and the first cooling section 32.

Further, the glass ribbon GR supplied from the supply device 20, may be supplied on the surface Ma of the molten metal M without dropping it downward in the vertical direction. For example, the glass ribbon GR may be discharged in the transport direction from the supply device 20 and may be supplied on the surface Ma of the molten metal M. In such a case, for example, the thickness of the slit 21a may be adjusted so that the thickness of the glass ribbon GR becomes a desired thickness at the time when discharged from the discharge section 21.

Only one of the second cooling sections 33, 34 may be provided, or both of them may not be provided. Further, the adjusting device 60 may not be provided. Further, the guide rolls 70 may not be provided.

Further, for example, a heating device for heating the glass ribbon GR may be provided on the downstream side in the transport direction. At the time of transporting the glass ribbon GR from the bath device 10 to the dross box 11, the glass ribbon GR is required to have flexibility to a certain extent, and therefore, it is necessary to make the temperature of the glass ribbon GR to be higher than the annealing point. However, there may be a case where the glass ribbon GR is cooled on the downstream side in the transport direction, and the temperature of the glass ribbon GR becomes to be at most the annealing point. In such a case, if a heating device (not shown) for heating the glass ribbon GR is provided on the downstream side in the transport direction, it is possible to make the temperature of the glass ribbon GR at the time of being transported from the bath device 10 to the dross box 11 to be higher than the annealing point, and it is possible to suitably transport the glass ribbon GR to the dross box 11.

Modification of First Embodiment

In a modification of the first embodiment, the forming apparatus may be further provided with a first shielding section 90 shown by a two-dot chain line in FIGS. 1 and 2 in the forming apparatus 1 in the above-described first embodiment. The first shielding section 90 is a rectangular plate-shape. The plan view shape of the first shielding section 90 is a rectangular shape elongated in the width direction, as shown in FIG. 2. The end on the upstream side in the transport direction of the first shielding section 90 is connected to the inner wall on the upstream side in the transport direction of the bath 10a. The edges on both sides in the width direction of the first shielding section 90 are connected to both sides in the width direction of the inner wall of the bath 10a. As shown in FIG. 1, the first shielding section 90 covers a portion on the upstream side in the transport direction than the portion where the glass ribbon GR is supplied, of the surface Ma of the molten metal M. That is, the first shielding section 90 is fixed to the inner wall of the bath 10a, at a portion located on the upper side in the vertical direction than where the molten metal M is stored. The first shielding section 90 is disposed between the discharge section 21 and the molten metal M in the vertical direction.

The first shielding section 90 shields at least part of the radiant heat radiated from the glass ribbon GR toward the molten metal M, whereby it is possible to prevent the temperature of the glass ribbon GR from being lowered. More specifically, the first shielding section 90 shields at least part of the radiant heat radiated from the glass ribbon GR toward the molten metal M, during the period from being discharged from the discharge section 21 until reaching the surface Ma of the molten metal M. The material of the first shielding section 90 is preferably, for example, graphite, ceramics, a fiber board or the like.

According to the modification of the first embodiment, in the supplying S11, by using the first shielding section 90, it is possible to shield at least part of the radiant heat radiated from the glass ribbon GR toward the molten metal M. Thus, it is thereby possible to suppress the temperature of the glass ribbon GR from decreasing and becoming lower than the softening point. Therefore, it is possible to adjust the thickness of the glass ribbon GR by e.g. letting it be dropped in the supplying S11 and to easily bring the thickness of the glass ribbon GR to be a more desired thickness.

Further, according to the modification of the first embodiment, the first shielding section 90 may be disposed between the discharge section 21 and the molten metal M. Therefore, it is possible to shield at least part of the radiant heat radiated from the discharge section 21 toward the molten metal M, and to prevent the temperature of the discharge section 21 from being lowered. Accordingly, it is thereby easy to make the temperature of the molten glass G in contact with the inner wall of the discharge section 21 to be higher than the temperature at which devitrification occurs and to suppress the devitrification from taking place. Thus, it is possible to suppress the flatness of the shape of the glass ribbon GR from being deteriorated.

Further, by using the first shielding section 90, it is possible to shield at least part of the radiant heat radiated from the glass ribbon GR toward the molten metal M at the discharge section 21 or its periphery, and therefore, it is possible to prevent the temperature of the molten metal M from increasing. Thus, the glass ribbon GR can suitably be cooled by the molten metal M.

Further, since the first shielding section 90 can shield at least part of the radiant heat radiated from the discharge section 21 toward the molten metal M, it functions also as a second shielding section, which will be described later.

Second Embodiment

Figure 4:
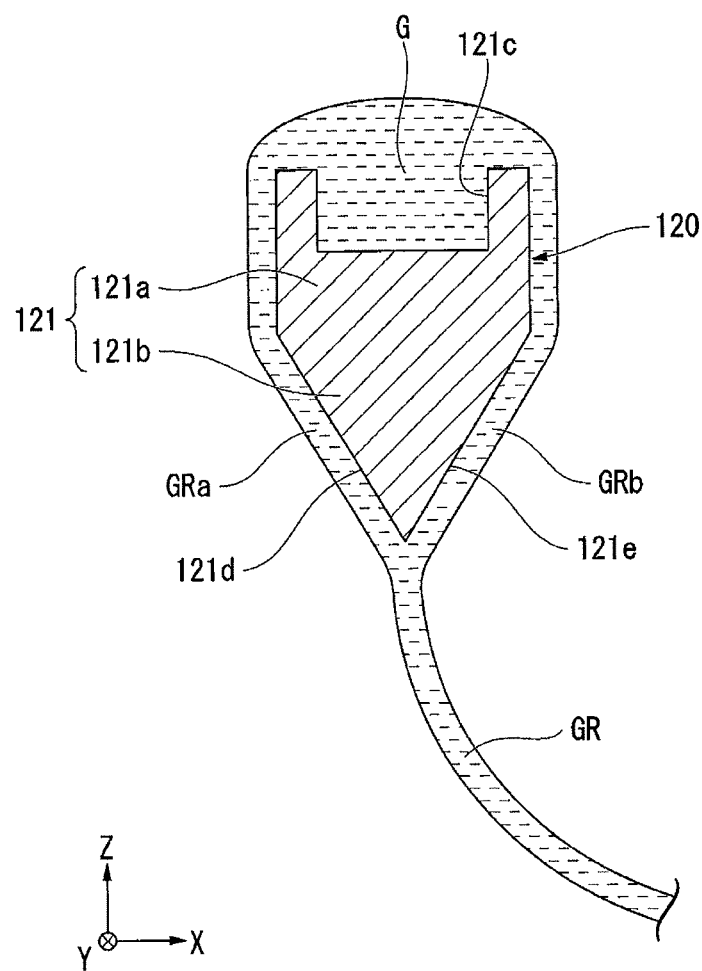
FIG. 4 is a cross-sectional view showing a portion of the supply device in the second embodiment.

The second embodiment differs from the first embodiment in the construction of the supply device. The discharge section 121 of the supply device 120 in the second embodiment shown in FIG. 4 may be made to be a columnar member extending in the width direction. The discharge section 121 preferably has an upper section 121a, and a lower section 121b.

The upper section 121a is a rectangular columnar shape extending in the width direction. On the upper surface of the upper section 121a, a recess 121c recessed toward the lower side in the vertical direction is formed. In the recess 121c, molten glass G is supplied. The lower section 121b is connected on the lower side in the vertical direction of the upper section 121a. The lower section 121b is a triangular prism shape extending in the width direction. The lower section 121b is convexed with an acute angle toward the lower side in the vertical direction.

The discharge section 121 preferably has a first surface 121d and a second surface 121e on which the molten glass G is transmitted. The first surface 121d is the surface on the upstream side in the transport direction of the discharge section 121. The first surface 121d is constituted by the surface on the upstream side in the transport direction of the upper section 121a and the surface on the upstream side in the transport direction of the lower section 121b, which are connected to each other. The surface on the upstream side in the transport direction of the upper section 121a is a surface perpendicular to the transport direction. The surface on the upstream side in the transport direction of the lower section 121b is a flat inclined surface located on the downstream side in the transport direction as it extends toward the lower side in the vertical direction.

The second surface 121e is constituted by a surface on the downstream side in the transport direction of the upper section 121a and a surface on the downstream side in the transport direction of the lower section 121b, which are connected to each other. The surface on the downstream side in the transport direction of the upper section 121a is a surface perpendicular to the transport direction. The surface on the downstream side in the transport direction of the lower section 121b is a flat inclined surface located on the upstream side in the transport direction as it extends toward the lower side in the vertical direction.

The lower end of the first surface 121d and the lower end of the second surface 121e are connected to each other. In the second embodiment, the lower end of the first surface 121d is the lower end of the surface on the upstream side in the transport direction of the lower section 121b. The lower end of the second surface 121e is the lower end of the surface on the downstream side in the transport direction of the lower section 121b.

The supply device 120 supplies the molten glass G in the recess 121c and lets the molten glass G overflow from the recess 121c. The molten glass G that overflows from the recess 121c is transmitted along the first surface 121d and the second surface 121e and moves to the lower side in the vertical direction while becoming a strip-shape. The molten glass G running down the first surface 121d becomes a strip-shape to form a first glass ribbon GRa. The molten glass G running down the second surface 121e becomes a strip-shape to form a second glass ribbon GRb. The first glass ribbon GRa and the second glass ribbon GRb are laminated at the lower end of the discharge section 121 to form the glass ribbon GR. The glass ribbon GR is supplied to the surface Ma of the molten metal M in the same manner as in the first embodiment.

In the supplying S11 in the second embodiment, it is possible to laminate the first glass ribbon GRa strip-shaped along the first surface 121d and the second glass ribbon GRb strip-shaped along the second surface 121e, and supply the laminated glass ribbon GR on the surface Ma of the metal M. Other constructions and methods in the second embodiment are the same as in the first embodiment.

According to the second embodiment, like the first embodiment, it is possible to simplify the structure of the forming apparatus, and it is possible to easily improve the forming accuracy of the molten glass G.

Third Embodiment

Figure 5:
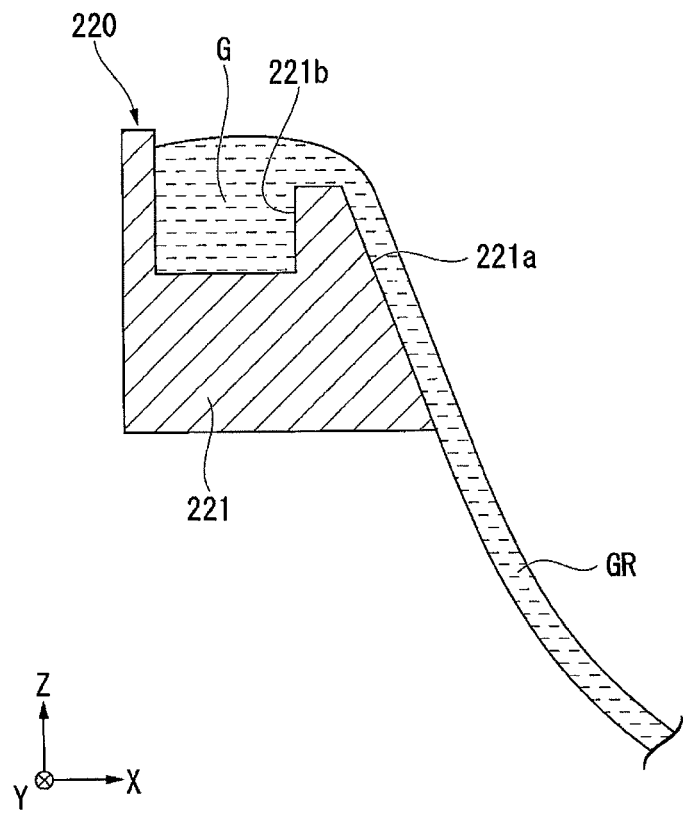
FIG. 5 is a cross-sectional view showing a portion of the supply device in the third embodiment.

The third embodiment is different from the first embodiment in the construction of the supply device. The discharge section 221 of the supply device 220 in the third embodiment as shown in FIG. 5 may be a columnar member extending in the width direction. The cross-sectional shape perpendicular to the width direction of the discharge section 221 is a substantially trapezoidal shape. At the upper surface of the discharge section 221, a recess 221b recessed to the lower side in the vertical direction is formed. In the recess 221b, molten glass G is supplied. The wall portion on the upstream side in the transport direction of the recess 221b extends to the upper side in the vertical direction more than the wall portion on the downstream side in the transport direction of the recess 221b.

The discharge section 221 may have an inclined surface 221a. The inclined surface 221a is a surface on the downstream side in the transport direction of the discharge section 221. The inclined surface 221a is an inclined surface which is located from the upper side in the vertical direction to the lower side in the vertical direction as it extends from the upstream side in the transport direction to the downstream side in the transport direction.

The supply section 220 supplies molten glass G in the recess 221b and lets the molten glass G overflow from the recess 221b. In the third embodiment, since the wall portion on the upstream side in the transport direction of the recess 221b extends on the upper side in the vertical direction more than the wall portion on the downstream side in the transport direction of the recess 221b, the molten glass G overflows only to the downstream side in the transport direction of the recess 221b. The overflown molten glass G moves to the lower side in the vertical direction as it is transmitted along the inclined surface 221a while becoming a glass ribbon GR. The glass ribbon GR thus formed is supplied to the surface Ma of the molten metal M in the same manner as in the first embodiment.

In the supplying S11l in the third embodiment, it is possible to let the molten glass G be transmitted along the inclined surface 221a and to supply the molten glass G in the form of the glass ribbon GR on the surface Ma of the molten metal M. Other constructions and methods in the third embodiment are the same as in the first embodiment.

According to the third embodiment, like the first embodiment, it is possible to simplify the structure of the forming apparatus, and it is possible to easily improve the forming accuracy of the molten glass G.

Fourth Embodiment

Figure 6:
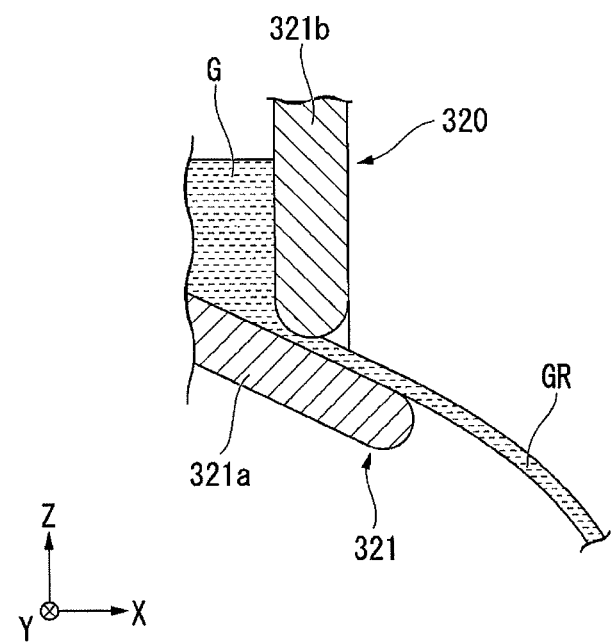
FIG. 6 is a cross-sectional view showing a portion of the supply device in the fourth embodiment.

The fourth embodiment differs from the first embodiment in the construction of the supply device. The discharge section 321 of the supply device 320 in the fourth embodiment may have, as shown in FIG. 6, a lip 321a and a tweel 321b. The lip 321a extends in a direction inclined so that it is located on the lower side in the vertical direction as it extends from the upstream side in the transport direction toward the downstream side in the transport direction. The upper surface of the lip 321a is an inclined surface located on the lower side in the vertical direction as it extends from the upstream side in the transport direction toward the downstream side in the transport direction. The tweel 321b is disposed with a gap on the upper side in the vertical direction of the lip 321a and extends in the vertical direction. The tweel 321b is movable in the vertical direction.

The molten glass G is dammed by the tweel 321b, and a part of the molten glass G is discharged in the form of a glass ribbon GR from the gap between the tweel 321b and the lip 321a. The glass ribbon GR is moved along the upper surface of the lip 321a and is discharged from the tip of the lip 321a toward the surface Ma of the molten metal M.

According to the fourth embodiment, by moving the tweel 321b in the vertical direction, it is possible to adjust the gap between the lip 321a and the tweel 321b. Therefore, it is possible to easily adjust the thickness of the glass ribbon GR discharged from the gap between the lip 321a and the tweel 321b.

Fifth Embodiment

Figure 7:
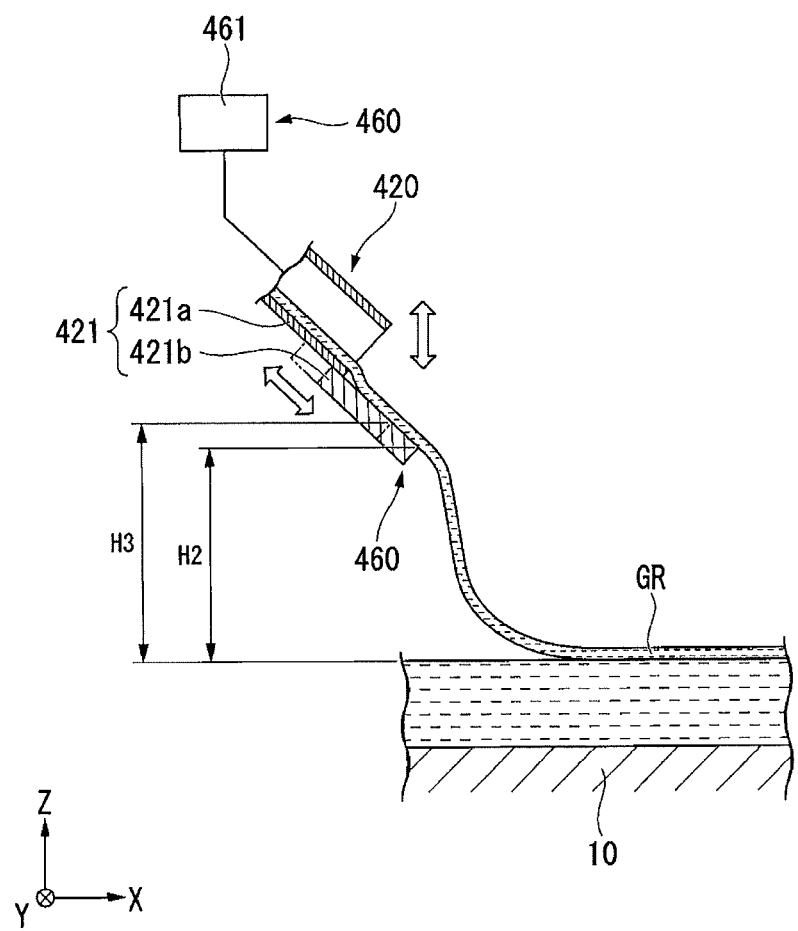
FIG. 7 is a cross-sectional view showing a portion of the supply device in the fifth embodiment.

The fifth embodiment differs from the first embodiment in the construction of the supply device and the adjusting device. The discharge section 421 of the supply device 420 in the fifth embodiment may have, as shown in FIG. 7, a cylindrical section 421a, and a movable section 421b. The cylindrical section 421a has a cylindrical shape extending in a direction inclined so that it is located on the lower side in the vertical direction as it extends from the upstream side in the transport direction toward the downstream side in the transport direction. The tip of the cylindrical section 421a is open. The molten glass G becomes a glass ribbon GR as it is transmitted on the inner wall surface on the lower side in the vertical direction of the inner wall surface of the cylindrical section 421a. The inner wall surface on the lower side in the vertical direction of the inner wall surface of the cylindrical section 421a is an inclined surface located on the lower side in the vertical direction as it extends from the upstream side in the transport direction toward the downstream side in the transport direction.

The movable section 421b may be attached to the cylindrical section 421a movably along the direction in which the cylindrical section 421a extends. The movable section 421b is attached to a portion on the lower side in the vertical direction of the cylindrical section 421a and protrudes on the lower side in the vertical direction obliquely on the downstream side in the transport direction than the cylindrical section 421a. The movable section 421b is, for example, a rectangular plate shape long in the width direction. The upper surface of the movable section 421b is an inclined surface located on the lower side in the vertical direction as it extends toward the downstream side in the transport direction. The glass ribbon GR discharged from the cylindrical section 421a is transmitted along the upper surface of the movable section 421b and is discharged from the discharge section 421.

The adjusting device 460 in the fifth embodiment may have a lifting device 461 and a movable section 421b of the discharge section 421. The lifting device 461 raises and lowers the supply device 420. The lifting device 461 is not particularly limited, so long as it is capable of raising and lowering the supply device 420. The lifting device 461 may be a device for lifting by supporting the supply device 420 from the lower side in the vertical direction like the lifting device 61 in the first embodiment, or an arm which expands and contracts in the vertical direction, by connecting the supply device 420 to a roof (not shown).

The adjusting device 460 is capable of adjusting the distance in the vertical direction between the discharge portion 421 and the surface Ma of the molten metal M, by driving at least one of the lifting device 461 and the movable section 421b. In the fifth embodiment, the distance in the vertical direction between the discharge portion 421 and the surface Ma of the molten metal M is the distance in the vertical direction between the end on the downstream side in the transport direction of the upper surface of the movable portion 421b and the surface Ma of the molten metal M.

For example, in a case where the movable section 421b is located in the position shown in solid lines in FIG. 7, the distance in the vertical direction between the end on downstream side in the transport direction of the upper surface of the movable section 421b and the surface Ma of the molten metal M, is a distance H2. On the other hand, when the movable portion 421b is moved to a position shown by a two-dot chain line in FIG. 7, the distance in the vertical direction between the end on the downstream side in the transport direction of the upper surface of the movable portion 421b and the surface Ma of the molten metal M, becomes the distance H3 which is larger than the distance H2. Thus, by moving the movable portion 421b, it is possible to adjust the distance in the vertical direction between the discharge portion 421 and the surface Ma of the molten metal M. Other constructions and methods in the fifth embodiment are the same as in the first embodiment.

According to the fifth embodiment, by moving the entirety or part of the discharge section 421 by the adjusting device 460, it is possible to adjust the distance in the vertical direction between the discharge section 421 and the surface Ma of the molten metal M. Therefore, as compared with a case of raising and lowering the bath 10a, the adjusting device 460 can easily be made to be small-sized, and the entire forming apparatus can easily be made to be small-sized.

Further, according to the fifth embodiment, the adjusting device 460 has two adjusting mechanisms i.e. the lifting device 461 and the movable section 421b, whereby it is easy to adjust the distance in the vertical direction between the discharge section 421 and the surface Ma of the molten metal M. Thus, it becomes easier to adjust the thickness of the glass ribbon GR.

Further, the adjusting device 460 in the fifth embodiment may have only either one of the lifting device 461 and the movable section 421b.

Sixth Embodiment

Figure 8:
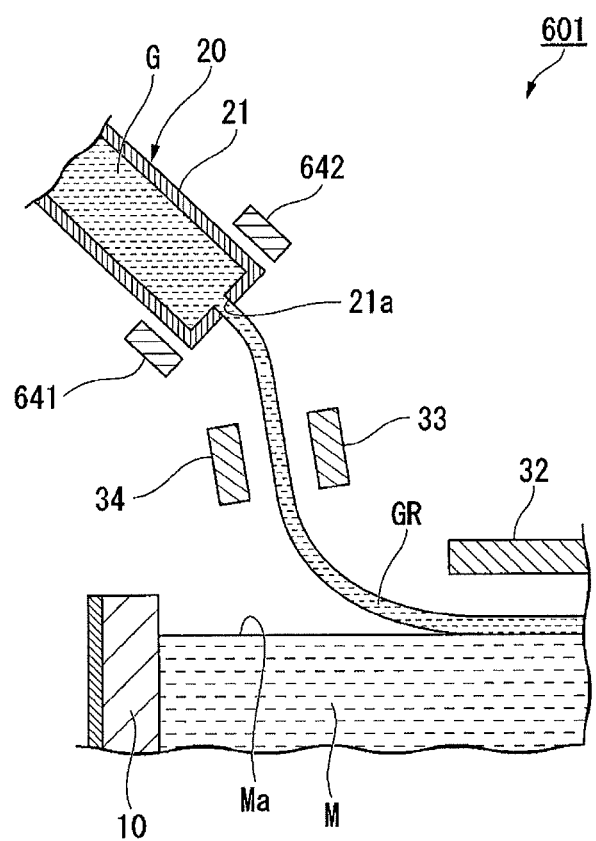
FIG. 8 is a cross-sectional view showing a portion of the forming apparatus for molten glass in the sixth embodiment.

The sixth embodiment differs from the first embodiment in that heating sections 641, 642 are provided. The forming apparatus 601 in the sixth embodiment can be provided with, as shown in FIG. 8, heating sections 641, 642. The heating sections 641, 462, will heat the discharge section 21 in the supplying S11. More specifically, the heating sections 641, 642 will heat the tip of the discharge section 21. The heating section 641 will heat the portion on the lower side in the vertical direction of the discharge section 21. The heating section 642 will heat the portion on the upper side in the vertical direction of the discharge section 21. The construction of the heating sections 641, 642 is not particularly limited so long as they can heat the discharging section 21.

The forming apparatus 601 is not provided with the first shielding section 90 in the modification of the first embodiment. Other constructions and methods in the sixth embodiment are the same as in the first embodiment.

According to the sixth embodiment, since the heating sections 641, 642 are provided for heating the discharge section 21, the temperature of the molten glass G in contact with the inner wall of the discharge section 21 can be made higher than the temperature at which devitrification occurs, to prevent the devitrification from occurring in the molten glass G. Thus, it is possible to suppress the flatness of the shape of the glass ribbon GR discharged from the discharge section 21 from being deteriorated.

Here, with respect to the heating sections 641, 642, only one of them may be provided. Further, in the sixth embodiment, the first shielding section 90 may be provided as in the modification of the first embodiment. In such a case, it is possible to heat the discharge section 21 by the heating sections 641, 642, while suppressing the temperature drop of the discharge section 21 by the molten metal M, by the first shielding section 90, whereby it is possible to better maintain the temperature of the molten glass G in the discharge section 21 to be higher than the temperature at which devitrification occurs.

Seventh Embodiment

Figure 9:
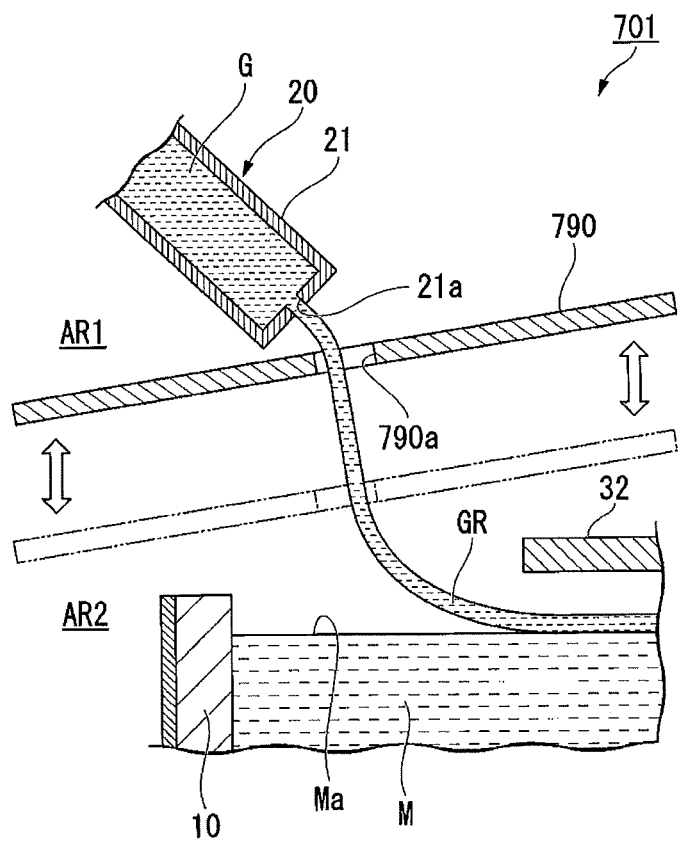
FIG. 9 is a cross-sectional view showing a portion of the forming apparatus for molten glass in the seventh embodiment.

The seventh embodiment differs from the first embodiment in that a second shielding section 790 is provided. The forming apparatus 701 in the seventh embodiment may be provided, as shown in FIG. 9, with a second shielding section 790. The second shielding section 790 is a rectangular plate shape. The second shielding section 790 extends in an inclined direction so that it is located on the upper side in the vertical direction as it extends from the upstream side in the transport direction toward the downstream side in the transport direction. The second shielding section 790 is disposed on the upper side in the vertical direction than the molten metal M, and on the lower side in the vertical direction than the discharge section 21.

In the second shielding section 790, a through hole 790a is formed which passes through the second shielding section 790 in the vertical direction. Although not shown, the through hole 790a is, for example, a rectangular hole extending in the width direction. The glass ribbon GR discharged from the discharge section 21 passes through the through hole 790a, moves to the lower side in the vertical direction than the second shielding section 790, and is supplied to the molten metal M.

The second shielding section 790 shields at least part of the radiant heat radiated from the discharge section 21 toward the molten metal M and the glass ribbon GR. The portion of the second shielding section 790 located on the upstream side in the transport direction than the glass ribbon GR is disposed between the discharge section 21 and the molten metal M in the vertical direction, and shields at least part of the radiant heat radiated from the discharge section 21 toward the molten metal M.

The portion of the second shielding section 790 located on the downstream side in the transport direction than the glass ribbon GR is disposed on the upper side in the vertical direction of the glass ribbon GR, and shields at least part of the radiant heat radiated from the discharge section 21 toward the glass ribbon GR. The end of the second shielding section 790 on the downstream side in the transport direction is disposed on the upper side in the vertical direction of the glass ribbon GR after being supplied on the surface Ma of the molten metal M.

The material of the second shielding section 790 is, for example, preferably graphite, ceramics, a fiber board or the like, like the first shielding section 90 in the modification of the first embodiment. In the seventh embodiment, in both the supplying S11 and the transporting S12, it is possible to shield at least part of the radiant heat radiated from the discharge section 21 toward the molten metal M and the glass ribbon GR.

The second shielding section 790 may be disposed to be movable in the vertical direction. The second shielding section 790 may be made to be movable, for example, between the position of the second shielding section 790 shown by a solid line and the position shown by a two-dot chain line in FIG. 9. The position of the second shielding section 790 shown by a solid line in FIG. 9 is in the vicinity of the discharge section 21. The position shown by a two-dot chain line in FIG. 9 is on the lower side in the vertical direction than the position of the second shielding section 790 shown by a solid line in FIG. 9. Although not shown, the forming apparatus 701 may be provided with a driving section that moves the second shielding section 790 in the vertical direction.

As is different from the first embodiment, the forming apparatus 701 may not be provided with the second cooling sections 33, 34. Further, the forming apparatus 701 may not be provided with the first shielding section 90 in the modification of the first embodiment. Other constructions and methods in the seventh embodiment are the same as in the first embodiment.

According to the seventh embodiment, since the second shielding section 790 is provided to shield at least part of radiant heat radiated from the discharge section 21 toward the molten metal M and the glass ribbon GR, it is possible to prevent the metal M and the glass ribbon GR from being heated by the heat of the discharge section 21. Thus, it is possible to suppress the temperature of the molten metal M from increasing. Accordingly, it is possible to suitably cool the glass ribbon GR by the molten metal M. Further, it is possible to prevent the temperature of the glass ribbon GR supplied on the surface Ma of the molten metal M from increasing. Therefore, the temperature of the glass ribbon GR after being supplied on the surface Ma of the molten metal M can easily be made to be lower than the softening point, and it is possible to prevent a change in the thickness of the glass ribbon GR on the surface Ma of the molten metal M.

Further, since it is possible to prevent the heat of the discharge section 21 from moving to the molten metal M and the glass ribbon GR, it is possible to prevent the temperature of the discharge section 21 from being lowered. Thus, it is easy to maintain the temperature of the molten glass G in the discharge section 21 to be higher than the temperature at which devitrification occurs, and it is possible to prevent devitrification from occurring.

Further, by the second shielding section 790, it is possible to suppress the heat exchange between a first area AR1 on the upper side in the vertical direction of the second shielding section 790 and a second area AR2 on the lower side in the vertical direction of the second shielding section 790. Thus, in the seventh embodiment, it is possible to keep the first area AR1 at a relatively high temperature, and it is possible to keep the second area AR2 at a relatively low temperature.

Here, the glass ribbon GR discharged from the discharge section 21 moves from the first area AR1 to the second area AR2 by passing through the through hole 790a of the second shielding section 790. Since the second area AR2 is maintained at a temperature lower than the first area AR1, the glass ribbon GR moved to the second area AR2 is cooled. Once the glass ribbon GR is cooled, the temperature of the glass ribbon GR is lowered, whereby the viscosity of the glass ribbon GR is increased. Accordingly, the glass ribbon GR is prevented from being stretched by its own weight, and the thickness of the glass ribbon GR tends to be scarcely changed during falling.

Thus, the change in the thickness of the glass ribbon GR during a period of being located in the second area AR2 during falling is smaller than the change in the thickness of the glass ribbon GR during a period of being located in the first area AR1 during falling. Therefore, it is possible to adjust the thickness of the glass ribbon GR that changes by its own weight during falling, by adjusting the ratio of the time period in which the glass ribbon GR is located in the first area AR1 to the time period in which the glass ribbon GR is located in the second area AR2. By making the proportion of the time period in which the glass ribbon GR is located in the first area AR1, to be larger, it becomes easier to let the glass ribbon GR be stretched by its own weight, whereby the thickness of the glass ribbon GR becomes smaller. By making the proportion of the time period in which the glass ribbon GR is located in the second area AR2, to be larger, it becomes more difficult to let the glass ribbon GR be stretched by its own weight, whereby the thickness of the glass ribbon GR becomes large.

In the seventh embodiment, the second shielding section 790 is disposed to be movable in the vertical direction. Therefore, by moving the second shielding section 790 in the vertical direction by a driving section (not shown), it is possible to change the ratio of the time period in which the glass ribbon GR is located in the first area AR1 to the time period in which the glass ribbon GR is located in the second area AR2. Specifically, as the second shielding section 790 is moved to the lower side in the vertical direction, the ratio of the time period in which the glass ribbon GR is located in the first area AR1 to the time period in which the glass ribbon GR is located in the second area AR2, increases. That is, for example, by letting the position of the second shielding section 790 be moved from the solid line position to the two-dot chain line position as shown in FIG. 9, it is possible to increase the proportion of the time period in which the falling glass ribbon GR is in the first area AR1. It is thereby possible to make the thickness of the glass ribbon GR smaller, as compared with the case where the second shielding section 790 is disposed at the position of the solid line shown in FIG. 9.

Further, for example, in a case where the second shielding section 790 is disposed at the position shown by the two-dot chain line in FIG. 9, the second shielding section 790 can shield at least part of the radiant heat radiated from the falling glass ribbon GR toward the molten metal M. That is, the second shielding section 790 can also function as a first shielding section.

Further, the portion of the second shielding section 790 located on the upstream side in the transport direction than the glass ribbon GR, and the portion of the second shielding section 790 located on the downstream side in the transport direction than the glass ribbon GR, may be provided to be movable independently of each other. In such a case, driving sections to move the respective portions independently are provided. Otherwise, the second shielding section 790 may have such a construction that only the portion located on the upstream side in the transport direction than the glass ribbon GR is provided in the second shielding section 790, or may have such a construction that only the portion located on the downstream side in the transport direction than the glass ribbon GR is provided in the second shielding section 790.

Further, the second shielding section 790 may have a construction to shield only either one of at least part of the radiant heat radiated from the discharge section 21 toward the molten metal M and at least part of the radiant heat radiated from the discharge portion 21 toward the glass ribbon GR. Further, shielding of the radiant heat by using the second shielding section 790 may be carried out at least in either one of the supplying S11 and the transporting S12. That is, the shielding of the radiant heat by using the second shielding section 790 may be carried out only in either one of the supplying S11 and the transporting S12.

Further, the second shielding section 790 may be disposed to be movable in a direction other than the vertical direction. For example, the second shielding section 790 may be disposed to be movable in the transport direction. In such a case, for example, it is possible to adjust the position in the transport direction of the through hole 790a to meet with the position in the transport direction of the falling glass ribbon GR. Thus, even if the position in the vertical direction of the second shielding section 790 is changed, it is easy to let the glass ribbon GR be passed through the through hole 790a. Further, the size in the transport direction of the through hole 790a can easily be made small within such a range that the glass ribbon GR can pass therethrough, whereby it is possible to improve the shielding effect of heat by the second shielding section 790. Further, the second shielding section 790 may be disposed to be movable in the width direction.

Further, in the seventh embodiment, the second cooling sections 33, 34 in the first embodiment may be provided. In such a case, it is easier to adjust the temperature of the falling glass ribbon GR, whereby it is easy to adjust the thickness of the glass ribbon GR. Further, the first shielding section 90 in the modification of the first embodiment may be provided.

In the above-described first embodiment to seventh embodiment, description has been made with respect to forming of a single layered molten glass G, but the present invention is not limited thereto, and may be applied to forming of a multi-layered molten glass G having, for instance, three layers of molten glass G laminated.

The type of molten glass G to be molded in each embodiment described above is not particularly limited. Each of the above embodiments is applicable to a variety of glass such as soda lime glass, alkali-free glass, etc.

Further, the above-described respective constructions may be suitably combined within a range not to be mutually inconsistent.

<Embodiment of the Method for Producing Glass Product>

Figure 10:
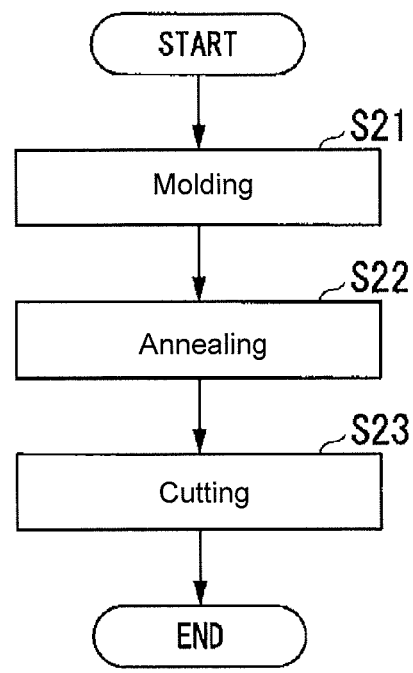
FIG. 10 is a flowchart of an example of the method for producing a glass product in the embodiment.

The method for producing a glass product in each embodiments of the present invention, may comprise, as shown in FIG. 10, a forming S21, an annealing S22 and a cutting S23.

First, the forming S21 is a step of forming molten glass G into a molded body having a desired shape by any one of the forming apparatus and forming method in the first embodiment to seventh embodiment.

Next, the annealing S22 is a step of annealing the molded body molded by the forming S21, i.e. the glass ribbon GR molded by any one of the forming apparatus and forming method in the first embodiment to seventh embodiment.

Then, the cutting S23 is a step of cutting the annealed molded body in a required length.

By the above steps, a glass product is produced.

In the method for producing a glass product in the embodiment of the present invention, molten glass G is molded by using the forming apparatus and forming method in the above-described respective embodiments, whereby it is possible to suppress the thickness of the glass product from becoming uneven, and it is possible to obtain a glass product excellent in quality.

Further, as the case requires, after the cutting S23, a polishing may be provided to polish the molded body after being cut. Further, the glass product may include one having processing such as surface treatment applied, or having a film bonded, to a molded body or glass melt product during the annealing S22, or to a molded body after the annealing S22 or after the cutting S23.

REFERENCE SYMBOLS

1, 601, 701: forming apparatus, 10a: bath, 20, 120, 220, 320, 420: supply device, 21, 121, 221, 321, 421: discharge section, 21a: slit, 30: cooling device, 31: temperature adjusting section, 32: first cooling section, 33, 34: second cooling section, 50: transport device, 60, 460: adjusting device, 61, 461: lifting device, 90: first shielding section, 121d: first surface, 121e: second surface, 221a: inclined surface, 641, 642: heating section, 790: second shielding section, G: molten glass, GR: glass ribbon, GRa: first glass ribbon, GRb: second glass ribbon, M: molten metal, Ma: surface, S11: supplying, S12: transporting, S12a: cooling, S22: annealing

What is claimed is:

1. A method for forming molten glass, comprising:
   adjusting a temperature of a portion of molten metal where a glass ribbon makes first contact with the molten metal such that a temperature of the portion of the molten metal is brought to be lower than a softening point of the molten glass and higher than an annealing point of the molten glass;
   setting a temperature of the molten glass in a supply device having a discharge section that discharges the molten glass in a strip shape and supplies the molten glass in a form of the glass ribbon such that a viscosity η of the molten glass become within a range of 1.5≤log η≤5 where η is in dPa·s;
   discharging the molten glass in the strip shape on a surface of the molten metal such that the molten glass is supplied in the form of the glass ribbon on a surface of the portion of the molten metal where the temperature is kept lower than the softening point of the molten glass and higher than the annealing point of the molten glass; and
   transporting the glass ribbon comprising the molten glass and supplied on the surface of the portion of the molten metal from an upstream side to a downstream side in a transport direction such that a thickness of the glass ribbon is maintained on the surface of the molten metal during the transporting,
   wherein the discharging comprises dropping the molten glass having a temperature of at least the softening point in the form of the glass ribbon vertically downward such that during the dropping, the glass ribbon is cooled by a cooling device configured to cool the glass ribbon, has a temperature of at least the softening point of the molten glass and is stretched by an own weight of the glass ribbon and adjusted to the thickness for the transporting, and said transporting includes cooling the glass ribbon being transported on the molten metal in a region on the upstream side in the transport direction such that the temperature of the glass ribbon becomes lower than the softening point of the molten glass in an entire width direction.

2. The forming method according to claim 1, wherein the cooling in the transporting the glass ribbon includes cooling the glass ribbon such that the temperature of the glass ribbon becomes higher than the annealing point in the entire width direction.

3. The forming method according to claim 2, wherein the adjusting includes lowering the temperature of the portion of the molten metal by a cooling device positioned to cool the portion of the molten metal and maintaining the temperature of the portion of the molten metal to be at least 560° C. and at most 750° C.

4. The forming method according to claim 2, wherein the temperature of the portion of the molten metal is at most 900° C.

5. The forming method according to claim 2, wherein the discharging includes shielding at least part of radiant heat radiated from the glass ribbon toward the molten metal.

6. The forming method according to claim 1, wherein the adjusting includes lowering the temperature of the portion of the molten metal by a cooling device positioned to cool the portion of the molten metal and maintaining the temperature of the portion of the molten metal to be at least 560° C. and at most 750° C.

7. The forming method according to claim 1, wherein the temperature of the portion of the molten metal is at most 900° C.

8. The forming method according to claim 1, wherein the discharging includes shielding at least part of radiant heat radiated from the glass ribbon toward the molten metal.

9. The forming method according to claim 1, wherein at least one of the discharging and the transporting includes shielding at least part of radiant heat radiated from a discharge section that discharges the molten glass toward the molten metal and the glass ribbon.

10. The forming method according to claim 1, wherein the cooling in the transporting the glass ribbon includes cooling the glass ribbon from an opposite side to a molten metal side.

11. The forming method according to claim 1, wherein a viscosity n of the glass ribbon in the dropping is adjusted such that the viscosity n of the glass ribbon does not become log η<1.5 where η is in dPa·s.

12. The forming method according to claim 1, wherein the transporting includes not exerting a force which deforms the glass ribbon.

13. The forming method according to claim 1, wherein the discharging includes discharging the molten glass from a slit at a discharge section such that the molten glass is formed into the glass ribbon.

14. The forming method according to claim 1, wherein the discharging includes discharging the molten glass from a discharge section having a declined surface such that the declined surface is declined in a vertical direction from the upstream side in the transport direction and declining toward the downstream side in the transport direction, and the discharging includes transmitting the molten glass along said declined surface such that the molten glass is formed into the glass ribbon.

15. The forming method according to claim 1, wherein the discharging includes discharging the molten glass from a discharge section having a first surface and a second surface such that the molten glass is transmitted on the first surface and the second surface, and that a lower end of the first surface and a lower end of the second surface are connected to each other, and the discharging includes laminating a first glass ribbon from the first surface and a second glass ribbon from the second surface such that the molten glass is discharged in the strip shape and supplied in the form of the glass ribbon.

16. A method for producing a glass product, comprising:
    annealing the glass ribbon which is formed by the method of claim 1.

* * * * *